United States Patent [19]

Townsend

[11] 4,073,192
[45] Feb. 14, 1978

[54] ADJUSTABLE VOLUME MEASURING CUP

[76] Inventor: Richard F. Townsend, 1752 North St., Anderson, Calif. 96007

[21] Appl. No.: 696,555

[22] Filed: June 16, 1976

[51] Int. Cl.² .............................................. G01F 19/00
[52] U.S. Cl. ...................................................... 73/429
[58] Field of Search ........................... 73/429, 426, 46; 220/94 R; 206/374, 375; 128/218 P, 218 M

[56] References Cited

U.S. PATENT DOCUMENTS

| | | | |
|---|---|---|---|
| 1,226,484 | 5/1917 | Ehrlich | 73/429 |
| 1,589,881 | 6/1926 | Hein | 128/218 P |
| 2,149,739 | 3/1939 | Langerman | 73/429 |
| 2,578,394 | 12/1951 | Blackman | 128/218 P |
| 2,587,692 | 3/1952 | Brown | 73/429 |
| 2,682,357 | 6/1954 | Bogossian | 73/429 X |
| 2,832,340 | 4/1958 | Dann et al. | 128/218 P |

FOREIGN PATENT DOCUMENTS 345,469  3/1960  Switzerland ........................... 73/429

*Primary Examiner*—Daniel M. Yasich
*Attorney, Agent, or Firm*—Blair & Brown

[57] ABSTRACT

An adjustable volume measuring cup in which the body of the cup is formed of clear plastic having a threaded opening in the axial center of the bottom thereof closed with a removable screw. A handle is threaded into the side of the cup and can be removed. A movable bottom of the cup is of cylindrical form and fits the internal diameter of the cup snugly so as to stay in position vertically in the cup when moved. The movable bottom has an axial threaded bore and the handle can be threaded into the threaded bore of the movable bottom by extending the handle through the opening left after removing the screw in the bottom of the cup so that the handle can then be used to move the movable bottom to a desired position within the cup in accordance with an external scale on the cup.

The handle is provided with a screwdriver blade on its outer end for engaging the screw closing the opening in the bottom of the cup.

1 Claim, 4 Drawing Figures

U.S. Patent   Feb. 14, 1978   4,073,192
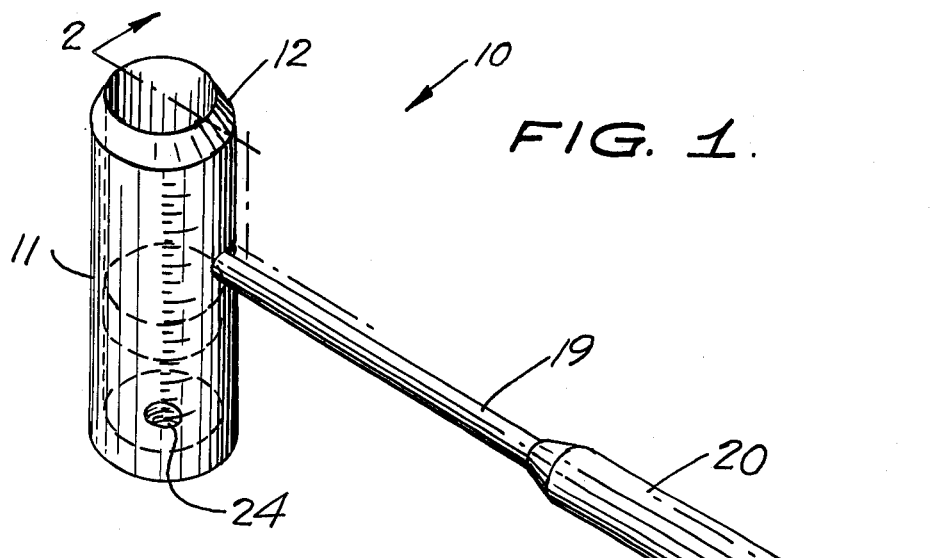
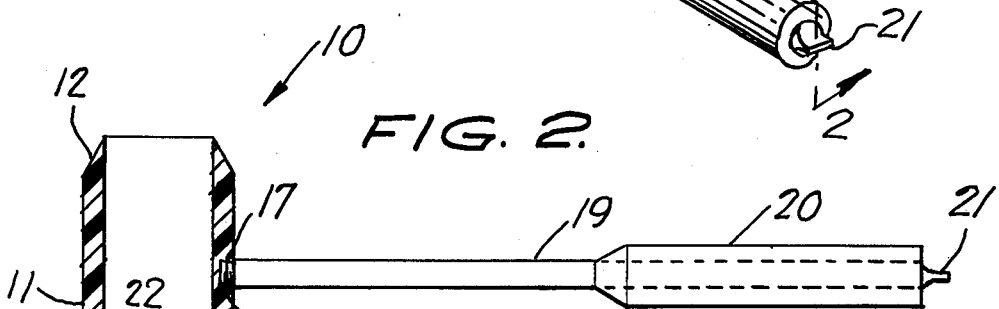
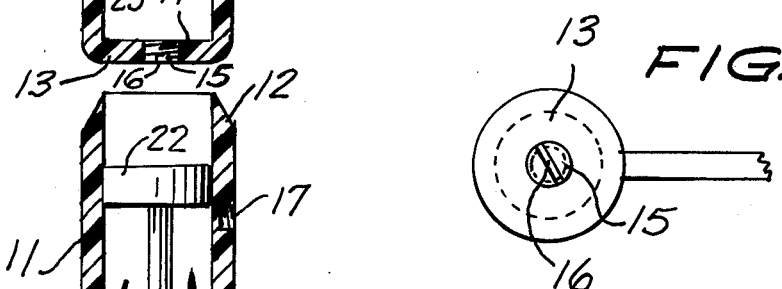
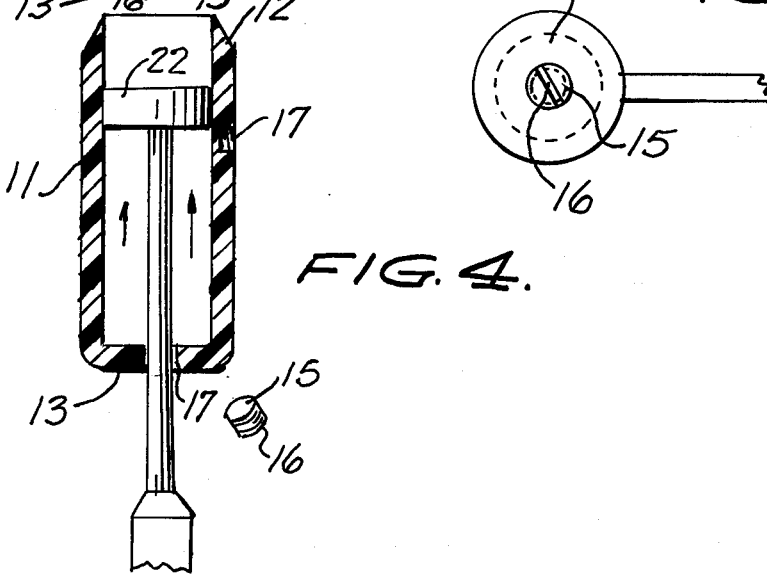

ADJUSTABLE VOLUME MEASURING CUP

BACKGROUND OF THE INVENTION

1. Field of the Invention

The present invention relates to an adjustable quantity measuring cup.

2. Summary of the Invention

The present invention includes a transparent measuring cup having a scale on its outer surface and a movable bottom within the cup for movement to a position along the scale to adjust the volume of the cup. A nonmovable bottom of the cup is provided with an axial threaded bore normally closed with a screw which can be removed to permit a screw handle to be inserted therethrough and engaged in a threaded bore in the movable bottom to move the movable bottom to a desired position.

The primary object of the invention is to provide a measuring cup which can be adjusted to any desired size particularly when multiple measurements of the same quantity is required.

Other objects and advantages will become apparent in the following specification when considered in light of the attached drawing.

BRIEF DESCRIPTION OF THE DRAWINGS

FIG. 1 is a perspective view of the invention;

FIG. 2 is a vertical sectional view taken along the line 2—2 of FIG. 1, looking in the direction of the arrows;

FIG. 3 is a fragmentary bottom plan view of the invention; and

FIG. 4 is a view similar to FIG. 2 with the handle in the process of adjusting the movable bottom.

DESCRIPTION OF THE PREFERRED EMBODIMENT

Referring now to the drawings in detail wherein like reference characters indicate like parts throughout the several figures, the reference numeral 10 indicates generally an adjustable volume measuring cup constructed in accordance with the invention.

The measuring cup 10 includes a generally cylindrical transparent plastic barrel 11 having a conically tapered top edge 12. The barrel 11 has a closure 13 on the end thereof opposite the conically tapered upper edge 12. The closure 13 has an axial threaded bore 14 extending therethrough and normally closed by a screw 15 having a screwdriver slot 16 formed therein. The barrel 11 has a threaded bore 17 formed in its side wall to receive a threaded end portion 18 on an elongate handle 19 having a hand grip portion 20 formed thereon. A screwdriver blade 21 is formed on the outer end of the rod 19 for engaging in the screwdriver slot 16 of the screw 15 to permit its removal.

A generally cylindrical movable bottom wall or disc 22 is slidably mounted within the barrel 11 and has an axial threaded bore 23 in its lower side adapted to receive the threaded end 18 of the handle 19. The movable bottom wall 22 fits the internal diameter of the barrel 11 with sufficient snugness so that it will remain in adjusted position.

A scale 24 is formed on the external surface of the barrel 11 and permits the bottom wall 22 to be aligned in any desired volumetric position to adjust the volume of the measuring cup 10 as desired.

In the use and operation of the invention, the handle 19 is removed from the threaded bore 17 and the screwdriver blade 21 is used to remove the screw 15 from the bottom wall 13. The handle is then inserted through the bore 14 and screwed into the movable bottom wall bore 23 so that the handle can then be used to move the movable bottom wall 22 in either direction within the barrel 11 until the desired position is reached. The handle 19 is then unscrewed from the movable bottom wall bore 23 and from the bore 14 so that the screw 15 can be replaced therein. The handle 19 is then screwed into the threaded bore 17 in the side of the barrel 11 and the adjustable volume measuring cup 10 is ready for use.

Having thus described the preferred embodiment of the invention, it should be understood that numerous structural modifications and adaptations may be resorted to without departing from the spirit of the invention.

What is claimed is:

1. An adjustable volume measuring cup comprising a generally cylindrical transparent plastic barrel having inner and outer walls and an open top portion and closed bottom portion, said closed bottom portion includes an opening centrally disposed therein and a removeable plug member formed to seal the opening, a disc frictionally contacted within the barrel's inner walls, said disc being parallel to said top and bottom portions and said cup is provided with removeable hand means which is transversely fastened to a threaded bore in said outer wall and can be removed therefrom to move said disc vertically upward or downward to vary the volume above and below said disc in said barrel to thereby adjust the capacity of said measuring cup, and said outer wall includes a scale for marking the position of said disc.

* * * * *